United States Patent [19]

Bowers

[11] Patent Number: 5,782,738

[45] Date of Patent: Jul. 21, 1998

[54] METHOD OF CONSTRUCTION OF AN ANNULAR ELEVATED PLATFORM

[76] Inventor: John Murray Bowers, Grey Street, Murchison, New Zealand

[21] Appl. No.: 574,225

[22] Filed: Dec. 18, 1995

[30] Foreign Application Priority Data

Apr. 27, 1995 [NZ] New Zealand .............. 270997

[51] Int. Cl.$^6$ ....................................................... E04B 1/00
[52] U.S. Cl. ........................................................ 52/742.14
[58] Field of Search ........................... 264/33–35; 14/77.1, 14/77.3; 52/742.14

[56] References Cited

U.S. PATENT DOCUMENTS

| | | | |
|---|---|---|---|
| 3,804,930 | 4/1974 | Dashew | 264/33 |
| 4,231,977 | 11/1980 | Schreck et al. | 264/33 |
| 4,717,517 | 1/1988 | Halberstadt | 264/33 |
| 4,768,938 | 9/1988 | Greeson | 264/33 X |
| 4,778,144 | 10/1988 | Gregory | 264/33 X |
| 4,921,649 | 5/1990 | Greeson | 264/33 |
| 5,072,474 | 12/1991 | Dilger et al. | 14/77.1 |
| 5,261,137 | 11/1993 | Barkdull | 14/77.1 |
| 5,460,499 | 10/1995 | Franklin | 264/33 X |

*Primary Examiner*—Carl D. Friedman
*Assistant Examiner*—Beth A. Aubrey
*Attorney, Agent, or Firm*—Ross,Ross & Flavin

[57] ABSTRACT

A method for constructing in situ an elevated annular platform. The steps include a) erecting a curved flanged support beam, b) locating a plurality of metal sheets about each side of the beam, c) positioning a supporting structure for the support of the sheets, d) locating an upright edging in defining a mold cooperantly with the sheets, e) positioning and securing reinforcing material within the mold, f) securing packaging within the mold, g) filling the mold, and h) removing the supporting structure and sheets.

18 Claims, 2 Drawing Sheets

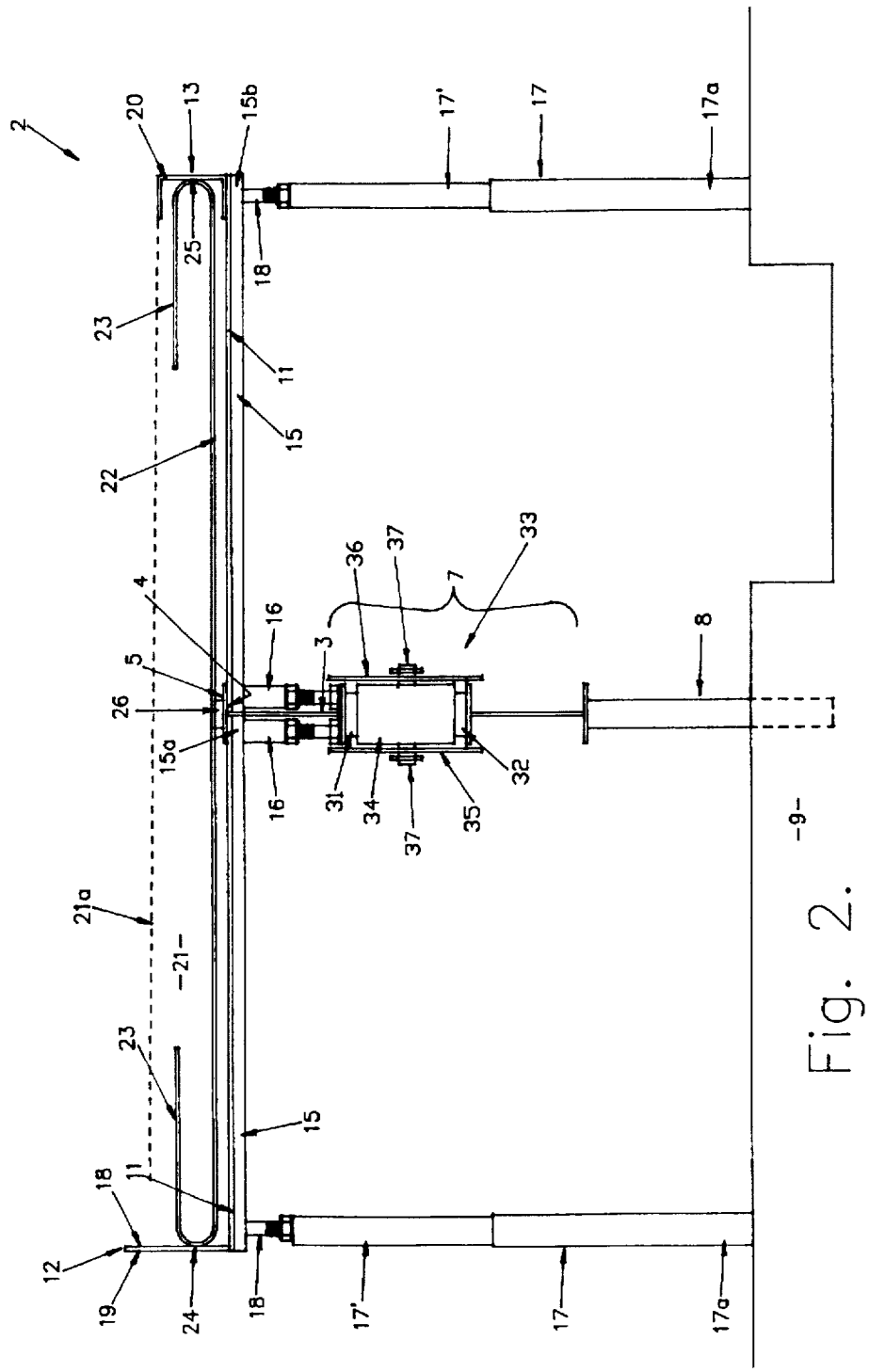

5,782,738

METHOD OF CONSTRUCTION OF AN ANNULAR ELEVATED PLATFORM

TECHNICAL FIELD

The present invention relates to a method of construction of an annular platform which is elevated and which is constructed in situ. Such platforms may be ones which rotate, for example, elevated rotating platforms for a milking shed. Preferably the construction is of an annular platform in one piece but can be a plurality of pieces, and is made of reinforced concrete.

BACKGROUND ART

Annular platforms that are elevated, slightly above ground, are known. These are generally platforms which either do not rotate or which are not made of reinforced concrete. Where elevated platforms are of reinforced concrete they are either not cast in situ (and are assembled on site) or are cast in a number of pieces, necessitated many days of pouring and curing to cast all the pieces of the annulus.

An object of the present invention is the provision of a method of constructing an elevated annular platform which can be cast in situ and cast in at least one pouring.

For the purposes of this specification, an "elevated annular platform" is a platform which is up to two meters off the ground. It may be supported on one side with, for example, a base or foundation underneath it. This support may be a support on the inner or outer side of the annulus, so that the outer or inner part of the platform is apparently cantilevered from the base or foundation. The platform may be supported along under the centre (that is the centre of the annulus of the platform) in addition to the above, or instead of the above support. It may therefore be a free-standing platform with a circular support means under the platform. Such support may or may not rotate with part or all of the means of rotation secured to the annulus.

Also for the purposes of this specification the term "centre line" is used to refer to the circle which falls at the centre of an annulus along a radial line from the centre point of the annulus, equidistant from the inner and outer edges of the annulus.

DISCLOSURE OF INVENTION

The present invention provides a method of construction of an annular platform, elevated up to two meters off the ground, said platform including an annulus of material which has an inner and an outer edge, said method including the steps of:

constructing an adequate foundation to take and support the weight of the platform and the dead and live loads to be applied thereon (when completed);

erecting a curved, flanged metal support beam which is positioned along the centre line of the intended position of the elevated annular platform and elevated to the selected height to ensure the required elevation of the platform, the top of said support beam having an inward and an outward flange or flanged edge;

locating a plurality of metal sheets about each side of said support beam to form a removable base for said annulus such that radially extending ends of adjacent sheets overlap one another at both the inner and outer edges of the annulus such that there is no end gap between any two adjacent sheets, nor any gap between said support beam and said sheets, and such that the edges of the sheets touching the support beam are under the flanges of said support beam;

locating sheet supporting means which support said sheets in position and arranged as described above and adjusting said sheet supporting means to maintain each sheet in the elevated position and support the weight of the platform to be formed on the sheets;

locating an upright edging around each of the inner and outer edges of said annulus, and securing each edging to said sheets, thereby providing a mould into which the material of the elevated annular platform can be poured;

positioning and securing within the mould the required reinforcing material;

positioning and securing within the mould the required blanks and packing for cutouts and channels to be formed in the finished platform;

filling the mould with material and allowing it to set and/or cure;

removing the sheet supporting means for said sheets, said sheets and the blanks and packing.

The present invention also provides an elevated annular platform, or part thereof, as made by the above described method.

Preferably said supporting means for said sheets is in the form of a plurality of hollow metal tubes or rods of a length which is slightly less than the distance from the support beam to the inner or outer edge of the annulus. Each tube or rod is supported by an adjustable jack at each end. A tube or rod and appropriate supports are positioned under each overlap of adjacent of sheets and between each overlap of sheets.

Preferably each sheet is of metal. Preferably, the upright edge supports are left in place to form part of the elevated platform, but may be removable.

Preferably the material used to fill the mould is concrete, but may be any other appropriate material, for example a plastics material, natural rubber or a compound incorporating either or both of these materials.

The flanged metal support beam may be a beam on its own or it may form part of another assembly. For example, it may be a part of an I-beam forming a top support of a rotary means for a rotating milking platform.

BRIEF DESCRIPTION OF DRAWINGS

By way of example only, a preferred embodiment of the present invention is described in detail with reference to a platform for a rotary milking shed and using a rotary means and with reference to the accompanying drawings, in which:

FIG. 2 is a section view along the line AA of FIG. 1.

MODE FOR CARRYING OUT THE INVENTION

Figure 1:
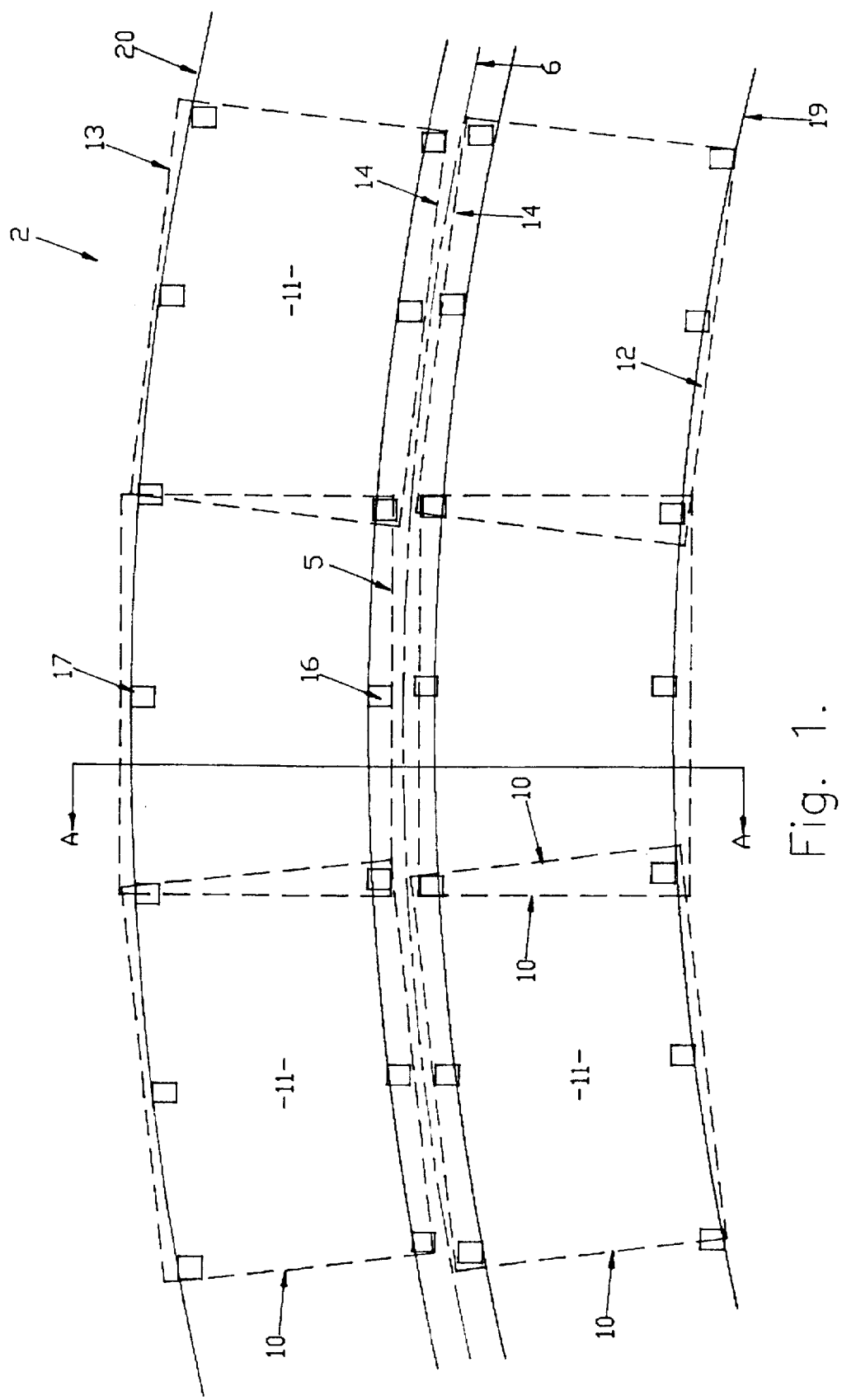
FIG. 1 is a plan view of a portion of an annulus of the present invention, part way through construction.

Referring to the drawings, an elevated annular platform 2 is thereshown in part. A top I-beam 3 forming part of a rotary means 7 includes a top flanged portion 4 with an upper flat surface 5 (FIG. 2). The I-beam 3 is positioned about the centre line 6 of the annulus of the platform 2. The rotary means 7 is supported by a base 8 of concrete or reinforced concrete, in known manner. Alternatively the base 8 may be a plurality of evenly spaced apart poles or beams rigidly secured to part of the rotary means 7. The base 8 is positioned on and secured to or on the ground or other surface 9 (for example, a concrete base).

A plurality of sheets 11 are disposed and arranged about either side of the flanged portion 4 of the top I-beam 3. The sheets 11 are rectangular in plan, but may be of other plan shapes, if so desired. The sheets 11 are positioned so that there is an overlap of adjacent sheets at the adjacent ends 10 of the sheets 11. Thus on the inner side of the annulus there will be less of an overlap of the sheets 11 by the beam portion 4 than at the inner edge 12 of the annulus. On the outer side of the annulus the overlap will be greater by the beam portion 4 than at the outer edge 13 of the annulus. The positioning of the sheets 11 is such that there are no gaps along the ends 10.

The inner sides 14 of each sheet 11, the edge adjacent the beam portion 4 is positioned underneath the respective flange of the beam portion 4 and the sheets 11 are arranged so that all the sides 14 of the sheets 11 are under the flange.

The sheets 11 are preferably of metal of sufficient thickness to support the weight of the platform 2 when poured. In practice it has been found that a thickness between 3 and 5 mm for the sheets 11 is workable. However the sheet 11 may be replaced with any other appropriate sheet 11 to take the weight of the platform 2 without structural deformation of the sheet 11.

The sheets 11 are rectangular. In practice it has been found that sheets 11 of a size 1200 by 800 mm are the most appropriate. At this size of sheet 11, the sheets 11 can be used whatever the size of the radius of the annulus of the platform 2. However, if so desired, the sheets 11 may be of other shapes. For example the sheets 11 may be curved on two sides and straight on two sides so that when in an appropriate position, the overlap between the ends 10 of adjacent sheets 11 or the overlap along the sides 14 of each sheet 11 and the flange of portion 4, is constant.

The sheets 11 are supported in an elevated position by a plurality of rolled hollow section (rhs) 15 lengths of metal. The rhs 15 is 25 mm square in cross-section. If so desired the size of the section may be larger or smaller (depending on the weight of the platform 2). The length of the rhs 15 is slightly less than the distance from the centre line 6 to the inner edge 12 (or outer edge 13). Thus one end 15a of the rhs 15 abuts the I-beam 3 and the second end 15b of each rhs 15 is under the outer edge 13 (or inner edge 12) of the platform 2.

The one end 15a of each rhs 15 is supported by a short screw-and-bolt jack 16 which is positioned on the flange of the bottom portion of the I-beam 3. The length of the jack 16 can be adjusted in known manner to ensure that the sheet 11 is firmly held against the underside of the beam portion 4. The second end 15b of each rhs 15 is supported by an upright rhs 17 to the top of which is secured a threaded bolt 18. The bolt 18 engages with a hole (not shown) in the second end 15b or with the second end 15b itself. The bolt 18 secures each upright rhs 17 to the second end 15b and allows for some adjustment of the height of each upright 17 to permit levelling of the sheets 11.

The upright rhs 17 is in two parts (17a, 17$^1$) one of which is a sleeve (17a) fitting for the other part 17$^1$. A split pin and plurality of holes (not shown) may be used in known manner to adjust the overall length of the upright 17. If so desired, the upright 17 may be one piece only. The bottom end 17a of each upright rhs 17 may be flattened and turned under, if so desired.

Each rhs 15 and upright rhs 17 may be replaced with other appropriate cross-sectional material. Alternatively, the rhs (15, 17) may be solid rods, bars etc. The material of the rhs (15, 17) may be steel, aluminium alloy, wood or iron, or any other appropriate material to take the weight of the platform 2. The length of the upright rhs 17 will vary, depending on the desired height of the platform 2 (already determined by the elevated position of the I-beam 3). However, in practice it has been found that the usual length of the upright rhs 17 is 600 mm.

A set of jack 16, rhs 15 and upright rhs 17 are placed under each overlap of adjacent sheets 11 so that an rhs 15 supports the overlap. Thus each rhs 15 is approximately radially aligned. In addition, one or more sets of jack 16, rhs 15 and upright rhs 17 is positioned under each sheet 11 such that the sets are evenly spaced about the annulus of the platform 2.

The jacks 16, rhs 15 and upright rhs 17 may be disassembled into each separate component when not in use (or on removal of the components upon disassembly of the mould). However, it will be appreciated that each set of jack 16, rhs 15 and upright 17 may be interconnected as one unit and remain so whether in use or otherwise.

At the inner edge 12 a curved metal upright edging 19 (FIG. 2) is positioned on the sheets 11 such that there is no gap between the sheets 11 and between the sheets 11 and edging 19. The edging 19 is continuous around the inner circumference of the annulus. If so desired, the edging 19 may comprise a plurality of curved sheets. Also, if desired, the edging 19 may continue only part of the way round the inner circumference of the annulus or be entirely absent.

The height of the edging 19 is greater than the intended depth of the concrete 21 in the mould so that a small, inner lip may be formed on the finished platform 2.

An outer edging 20 is provided in similar manner along the outer edge 13 of the platform 2. The outer edging 20 is in the form of a square I facing inwards. The bottom leg of the I rests on the sheets 11 and may be tack welded or otherwise secured thereto, if so desired. The top leg of the I is level with the top of the concrete 21 at the outer edge 13. A straight edging 19, or other preferred shape may be used in place of the I shape, if so desired. The edging 19 may be continuous about the outer edge 13, or may be partial or absent (as is desired).

The sheets 11, beam portion 4 and edging 18, 19 form the mould into which the material of the platform 2 is poured. The material used is concrete or reinforced concrete. However other materials may be used if desired. For example, other materials that would be suitable include: a rigid plastics material, preferably one that is ultra-violet light resistant, or a nylon with similar qualities; a natural or synthetic rubber; and any combination of these materials; and compounds containing these materials.

In FIG. 2 the top surface 21a is shown as sloping from the inner edge 12 to the outer edge 13. If so desired, the top surface 21a may be flat or slope in a different direction.

Steel reinforcing or other reinforcing is placed within the mould. A plurality of lengths 22 of reinforcing with I shaped ends 23 are tack welded (or otherwise secured) to the inner edging 19 (24) the outer edging 20 (25) and the top surface 5 of the beam portion 4 (26). The lengths 22 are evenly spaced about the annulus. Curved lengths of reinforcing (not shown) are positioned parallel to the centre line 6. These lengths can extend continuously around the annulus or not, as is desired. The curved lengths are evenly spaced between the inner and outer edges (12, 13). These lengths are spot welded or otherwise secured to the reinforcing lengths 22. Thus if the upright edging 19 is not tack-welded to the sheets 11 the reinforcing 22 keeps the edging 19 in position whilst the mould is filled.

The rotary means 7 includes an upper guide means 31, a lower guide means 32, a plurality of roller bearings or rollers 33 and a power source (not shown) to rotate to relate the platform 2. The upper guide means 31 is either secured to or forms part of the I-beam 3 of the platform 2 and the lower guide means 32 is either secured to or forms part of the base 8.

The rollers 33 include a central portion 34 of circular cross-section which is slightly wider than the two guides 31, 32 (and also the I-beam 3 and the base 8 to which they are respectively secured), and a flange 35 an 36 on each end of the central portion. The flange 35, 36 diameters' are such that the two guides 31, 32 are maintained between them.

Metal strips (not shown) are secured to the upper guide 31 at each end of the rollers 33 such that each roller 33 may be axially secured into one position with respect to the guide 31. Thus the rollers 33 are spatially separated. The metal strips are kept rigid relative to one another and to the guide 31 by a plurality of bars (not shown) rigidly secured therebetween. Preferably the distance between the metal strips is uniform around the circumference of the platform 2. Preferably the metal strips are secured to the upper guide means.

The two guides 31, 32 are of metal, preferably steel, or any other suitable material on which the rollers 33 can run.

The rollers 33 can be of any material suitable for the purpose, but are preferably of nylon. The use of nylon rollers means that the rollers 33 and the surfaces 31 and 32 with which they come into contact do not need lubricating. The rollers 33 act as both radius bearings (or bearings) and compression bearings or rollers.

It will be appreciated that the platform 2 may be used with any other means of rotation, with appropriate adjustments to the placement of the beam portion 4, or the component providing the beam portion 4.

The above described elements are used in the method of construction of the present invention in the following manner: The rotary means 7 and top I-beam 3 are positioned as desired for the appropriate radius of platform and appropriate elevation. The sheets 11 and the jacks 16, rhs 15 and upright rhs 17 are loosely positioned at spacings as described above, so that the sheets 11 overlap at the adjacent ends 10, underlap the flange of the beam portion 4 and leave no gaps. The jacks 16 and uprights 17 are adjusted to secure each sheet 11 in its desired position. The bolts forming part of the jacks 16 and the bolts 18 may be adjusted to alter the angle or level of the sheets 11 so that the desired slope on the underside of the platform 2 is attained.

The inner and outer edging (19, 20) are positioned on the sheets 11 on the inner and outer edges (12, 13 respectively), as described above. The sheets 11 and inner and outer edging and surfaces (19, 20) form a mould for the concrete 21 for the platform 2. The reinforcing (22 and circumferentially lengths (not shown)) are positioned and tack welded or otherwise secured, as described above, to the edging (19, 20) and the surface 5 and, where relevant, to each other. If so desired, the inner surfaces of the mould are sprayed or coated with a silicon sealant, especially around or on the joins in the metal. Any other sealant coating may be used, if so desired.

Any blanks and packing (not shown) for spaces or holes to be left in the platform 2 are positioned, and if necessary filled with sand or other spacing material. If so desired, upright posts (such as might be used for the bails of the milking platform 2) are secured each in its appropriate position, by securing the post to the reinforcing 22 or the edging (19, 20), as is desired. Such blanks may include blanks for later channelling as conduit(s) (for piping, electrical cables etc), or for bail dividers, etc.

The concrete 21 is poured so that the mould is filled to the top of the outer edging 20. A slope 21a, as described above may be used on the top surface of the concrete 21. The concrete 21 is allowed to set and cure. The packing and blanks, if present, are removed in known manner.

The sheets 11 are then removed by releasing the upright rhs 17 and jack 16 for each rhs 15. The upright rhs 17, jack 16, and each rhs 15 are removed and dismantled or left as a set (as is desired). The sheets 11 are removed from the underside of the concrete 21. Once cleaned, the sheets 11 may be reused. The edging (19, 20) remain as part of the platform 2, if so desired. After sheets 11 and all uprights rhs 17, jacks 16 and rhs 15 are removed, the concrete 21 and edging (19, 20) remain as the elevated annular platform 2, atop the I-beam 3.

The above-described platform 2 has been described as being formed as one piece. However, it will be appreciated that only part of the annular mould need be constructed (and including boxing at the ends thereof). Thus the annulus of the platform 2 may be constructed in two or more pieces. Obvious variations of this alternative are also possible (for example, reusing the mould elements more than once for different parts of the annulus of the platform 2, leaving the sheets 11 in position, etc).

I claim:

1. A method of construction of an annular platform, elevated up to two meters off the ground, said platform comprising an annulus of material which has an inner and an outer edge, said method comprising the steps of:

constructing an adequate foundation to take and support the weight of the platform and the dead and live loads to be applied thereon (when completed);

erecting a curved, flanged metal support beam which is positioned along the centre line of the intended position of the elevated annular platform and elevated to the selected height to ensure the required elevation of the platform, the top of said support beam having an inward and an outward flange or flanged edge;

locating a plurality of metal sheets about each side of said support beam to form a removable base for said annulus such that radially extending ends of adjacent sheets overlap one another at both the inner and outer edges of the annulus such that there is no end gap between any two adjacent sheets, nor any gap between said support beam and said sheets, and such that the edges of the sheets touching the support beam are under the flanges of said support beam;

locating sheet supporting means which support said sheets in position and arranged as described above and adjusting said sheet supporting means to maintain each sheet in the elevated position and support the weight of the platform to be formed on the sheets;

locating an upright edging around each of the inner and outer edges of said annulus, and securing each edging to said sheets, thereby providing a mould into which the material of the elevated annular platform can be poured;

positioning and securing within the mould the required reinforcing material;

positioning and securing within the mould the required blanks and packing for cutouts and channels to be formed in the finished platform;

filling the mould with material and allowing it to set and/or cure;

removing the sheet supporting means for said sheets, said sheets and the blanks and packing.

2. The method of construction of an elevated annular platform as claimed in claim 1 wherein said supporting means for said sheets is in the form of a plurality of supporting units, each unit including a hollow metal tube or rod, each tube or rod being supported by an adjustable jack at each end.

3. The method of construction of an elevated annular platform as claimed in claim 2 wherein one said supporting unit is positioned under each overlap of adjacent sheets.

4. The method of construction of an elevated annular platform as claimed in claim 3 wherein at least one supporting unit is positioned between each overlap of adjacent sheets.

5. The method of construction of an elevated annular platform as claimed in claim 4 wherein said support beam is an I-beam and each adjustable jack used adjacent the centre line of the annulus is a short screw-and-bolt jack which is used between upper and lower flanges of said I-beam.

6. The method of construction of an elevated annular platform as claimed in claim 5 wherein the second jack supporting a tube is in three parts, the first part being a sleeved length of tube into which a second length of tube is adjustably secured, the third part being a threaded bolt for adjustable inter-engagement with the second end of said tube or rod.

7. The method of construction of an elevated annular platform as claimed in claim 6 wherein the tube components of the sets are made of a rolled hollow section.

8. The method of construction of an elevated annular platform as claimed in claim 7 wherein the tube components of the sets are made of a material selected from the group consisting of steel, aluminium alloy, wood, iron, a rigid plastics material, and a combination of any of these.

9. The method of construction of an elevated annular platform as claimed in claim 8 wherein the sheets are rectangular in shape.

10. The method of construction of an elevated annular platform as claimed in claim 9 wherein the inner upright edging is curved and is greater in height than the intended depth of material in the mould.

11. The method of construction of an elevated annular platform as claimed in claim 10 wherein the outer edging is curved and is, in cross-section, a square I in shape facing inwards to the centre of the platform, the top leg of the I shape being the same height as the height of the material in the mould.

12. The method of construction of an elevated annular platform as claimed in claim 11 wherein the material filling the mould is selected from the group consisting of: concrete, reinforced concrete, a rigid, plastics material, natural or synthetic rubber, compounds containing any of these materials, and a combination of any of these materials.

13. The method of construction of an elevated annular platform as claimed in claim 12 wherein if reinforcing is required it is in the form of steel reinforcing comprising a plurality of lengths with I shaped ends, said lengths having substantially the same length as the width of the annulus of the platform, said lengths being evenly spaced about the annulus and secured at one end to each of the inner and outer edging.

14. The method of construction of an elevated annular platform as claimed in claim 13 wherein said reinforcing further comprises a plurality of curved lengths of reinforcing steel positioned parallel with the centre line.

15. The method of construction of an elevated annular platform as claimed in claim 14 wherein said method further comprises securing a rotating means between said foundation and said support beam, said means including: tracking means which is circular in plan and positioned underneath said platform, a first part of which is stationery and a second part of which rotates with said platform; a plurality of rollers positioned along said tracking means and uniformly spaced around the circumferential distance of the tracking means forming a continuous bearing means which rotates with said platform; spacing means to keep said rollers uniformly spaced along said tracking means; and driving means to rotate said second part of said tracking means and said platform.

16. A method of construction of an annular platform, elevated up to two meters off the ground, said platform comprising an annulus of material which has an inner and an outer edge, said method comprising the steps of:

constructing an adequate foundation to take and support the weight of the platform and the dead and live loads to be applied thereon (when completed);

erecting a curved rotating means which is positioned along the centreline of the intended position of the elevated annular platform, said means including: tracking means which is circular in plan and positioned underneath said platform, a first part of which is stationery and a second part of which rotates with said platform; a plurality of rollers positioned along said tracking means and uniformly spaced around the circumferential distance of the tracking means forming a continuous bearing means which rotates with said platform; spacing means to keep said rollers uniformly spaced along said tracking means; and driving means to rotate said second part of said tracking means and said platform;

securing a flanged metal support beam which is elevated to the selected height to ensure the required elevation of the platform, the top of said support beam having an inward and an outward flange or flanged edge;

locating a plurality of metal sheets about each side of said support beam to form a removable base for said annulus such that radially extending ends of adjacent sheets overlap one another at both the inner and outer edges of the annulus such that there is no end gap between any two adjacent sheets, nor any gap between said support beam and said sheets, and such that the edges of the sheets touching the support beam are under the flanges of said support beam;

locating sheet supporting means which support said sheets in position and arranged as described above and adjusting said sheet supporting means to maintain each sheet in the elevated position and support the weight of the platform to be formed on the sheets;

locating an upright edging around each of the inner and outer edges of said annulus, and securing each edging to said sheets, thereby providing a mould into which the material of the elevated annular platform can be poured;

positioning and securing within the mould the required reinforcing material;

positioning and securing within the mould the required blanks and packing for cutouts and channels to be formed in the finished platform;

filling the mould with material and allowing it to set and/or cure;

removing the sheet supporting means for said sheets, said sheets and the blanks and packing.

17. The elevated annular platform constructed by the method of claim 1.

18. The elevated annular platform constructed by the method of claim 16.

* * * * *